Oct. 18, 1960

M. M. PALO 2,957,052

PHONOGRAPH STYLUS AND HOLDER THEREFOR

Filed Oct. 16, 1956

INVENTOR

MAURICE M. PALO

BY Francis J. Klempay

ATTORNEY 2,957,052

PHONOGRAPH STYLUS AND HOLDER THEREFOR

Maurice M. Palo, Conneaut, Ohio, assignor to The Astatic Corporation, Conneaut, Ohio, a corporation of Ohio Filed Oct. 16, 1956, Ser. No. 616,152

6 Claims. (Cl. 179—100.41)

The present invention relates to pick-up cartridge assemblies of the type commonly incorporated in phonograph tone arms and the like, and more particularly to improvements in the stylus assemblies employed in these cartridges and means for attaching the same to such cartridges.

It will be understood that the record engaging tips of styli embodied in phonograph pick-up cartridges are subjected to deterioration and wear due to the severe operating conditions under which they are used. Even though extremely hard material, such as osmium, sapphire, ruby or the like, are used, the styli must be replaced from time to time since they are, in general, more fragile and subject to more wear than is the rest of the cartridge assembly to which they are attached.

In the modern type of pick-up cartridge, and with the development of micro-groove or long playing record discs and a demand for higher fidelity in the reproduced sound, it has become necessary to provide a stylus having relatively reduced weight or mass, increased compliance and mechanical impedance matched with the cartridge under consideration. Such a stylus is illustrated in U.S. Patent 2,601,988 to Chorpening et al. and assigned to the assignee of the present invention wherein there is disclosed a stylus, formed of sheet metal material, and into which is incorporated controllable degrees of both lateral and vertical compliance. In U.S. Patent 2,575,999 to Cordes, also assigned to the assignee of the present invention, there is shown a stylus which is physically supported and retained in the cartridge at a point remote from the record engaging tip thereof and remote from the area of mechanical connection with the active piezo-electric transducer element housed in the cartridge. The mechanical advantages of such an arrangement are further explained in the co-pending application of Jacque et al., filed January 28, 1955, and assigned to the assignee of the present invention, wherein the stylus of Cordes is utilized in connection with a compliant nose piece to drive the transducer assembly.

The present invention provides a novel means for adapting the stylus constructed in accordance with the teaching of the patent of Chorpening et al. to a cartridge operating in the manner shown in the Jacque et al. application or Cordes patent. The advantages of the several disclosures mentioned above are thus combined for employment in a pick-up cartridge. According to the principles of the present invention the stylus is securely attached in such a manner that its operation is controlled only by the inherent physical characteristics of the material from which it is fabricated. The improved mounting means for the stylus allow accuracy in attaching the stylus and this means is protected from inadvertant loss while yet being accessible for manipulation.

It is accordingly a prime object of the invention to provide a new and novel means for attaching a stylus to a phonograph pick-up cartridge.

A further object of the invention is the provision of means for securing the stylus attaching means against loss.

Another object of the invention is to provide an improved detachable stylus for use with a phonograph pick-up cartridge.

Another object of the invention is to provide a phonograph stylus and holder therefor which is characterized by its extreme simplicity in manufacture.

Yet another object of the invention is the provision of a stylus and holder therefor wherein the stylus may be readily and easily removed and replaced when the same becomes worn.

These, as well as other objects and advantages of the invention, will become more readily apparent upon consideration of the following specification and accompanying drawing wherein there is described and shown a preferred embodiment of the apparatus of the present invention.

Figure 1:
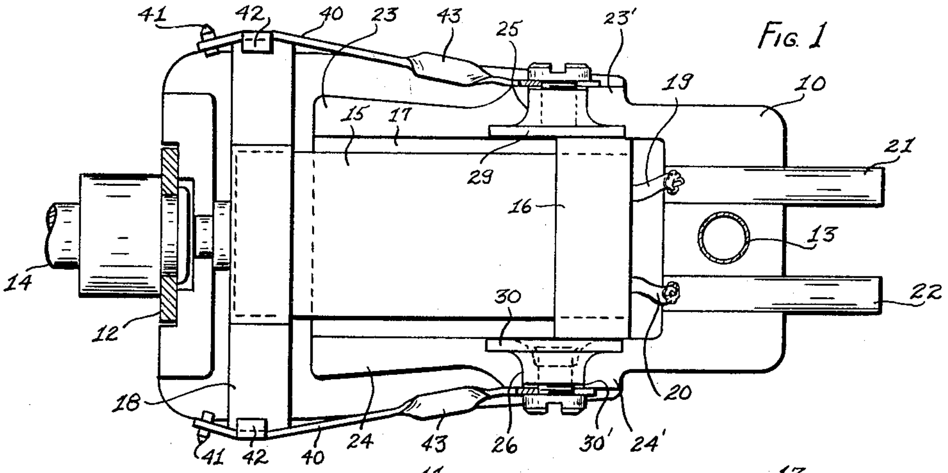
Figure 1 is an enlarged longitudinal section view of a phonograph cartridge embodying the teachings of my present invention.

Referring now to the drawing, and initially to Figures 1 and 2 thereof, the reference indicia 10 and 11 designate complimentary molded plastic housing sections or "halves" which together form a housing or casing for a cartridge assembly, the housing sections 10 and 11 being secured together by a fork-like metal band 12 and a tubular rivet 13 in such a manner as to define a hollow cavity 17 for the reception of components to be hereinafter more fully described. In accordance with usual practice the housing sections are provided with a suitable mounting stud 14 by means of which the housing may be properly secured in a phonograph tone arm, not shown, and journaled in said tone arm for rotation into predetermined positions as is well known in the art.

Housed within the hollow cavity 17 is a piezo-electric electro-mechanical transducer element 15, which may be a crystal bimorph, for example, that is gripped at its right hand end by a pair of resilient clamping pads 16. The left hand end of the transducer element 15 is generally free and mounts a compliant nose piece 18 of the type and in the manner set forth in the above identified Jacque et al. patent application. Suitable electrical leads 19 and 20 connect with a pair of terminal pins 21 and 22 which may have wires, not shown, extending therefrom and leading to ancillary amplifier equipment, also not shown, in a well known manner.

Figure 3:
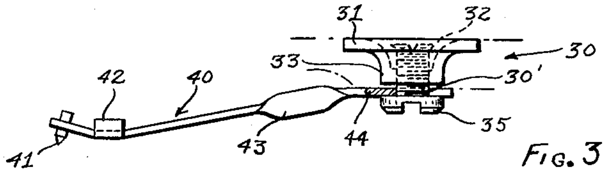
Figure 3 is a fragmentary side elevation of the stylus and stylus holder members of the type incorporated in the assembly of Figure 1.
Figure 4:
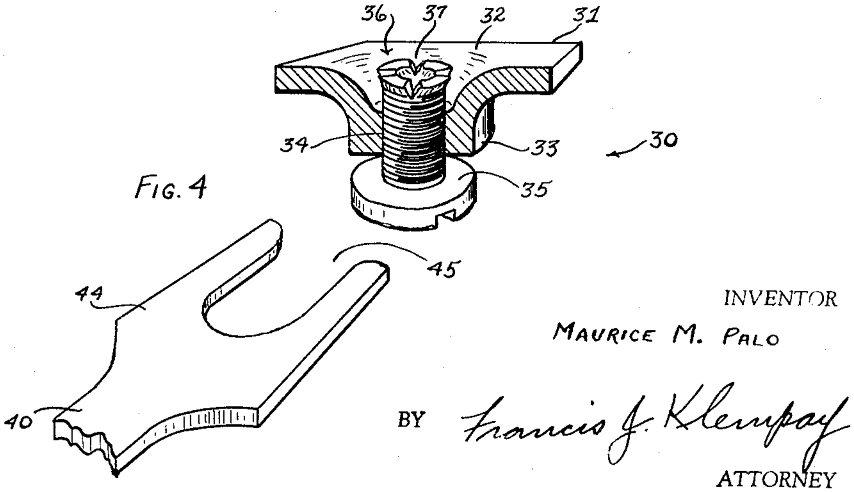
Figure 4 is an exploded fragmentary view of the stylus holder and a portion of the stylus of the cartridge assembly shown in Figure 1.

Each of the housing sections 10 and 11 is provided with upper and lower walls 23 and 24, respectively, which partially define the cavity 17 and have portions of greater thickness 23' and 24' to provide adequate areas for attaching the stylus holder of the present invention. In each of the housing sections 10 and 11 at the thickened portions 23' a recess 25 is provided so that when these housing sections are in assembled relation the recesses 25 cooperate to retain and hold a stylus holder insert 29. Like recesses 26 are provided in the thickened portions 24' of the lower walls 24 of the housing sections 10 and 11 and these recesses are adapted to accommodate a stylus holder insert 30 when in assembled relation. Since both of the stylus holder inserts 29 and 30 are identical only the latter will be further described and for this purpose attention is directed to Figures 3 and 4 of the drawing.

The stylus holder insert 30 is formed, as by stamping, for example, into a generally cup-like shape and has a square or rectangular flange 31 which is non-circular in plan outline to prevent the stylus holder insert 30 from turning in the recesses 26 provided in the housing sections. In this manner the stylus insert holder is always retained in proper relation with respect to the housing and undesirable movement of the same is prohibited. The center portion of the flange 31 is formed to provide a dished cup-like recess 32 on its inner face while the outer face defines a boss 33 having a generally circular outer periphery and a flat bottom surface. A threaded aperture 34 is provided in the exact center of the boss 33 and this threaded aperture receives a similarly threaded flat-headed screw 35. The upper end 36 of the flat-headed screw 35 is slotted as at 37 so that after insertion into the threaded aperture 34 the upper end 36 may be splayed or flared to prevent the flat-headed screw from being entirely removed. It will be understood that only the extreme upper portion of the flat-headed screw 35 is flared so that the same may be moved relative to the stylus holder insert 30 but that it cannot be removed from the stylus holder insert thus completely eliminating any chance of losing or misplacing the screw.

For use with the stylus holder insert 30 above described I provide a stylus 40 which is preferably stamped from a sheet of spring-like material, such as Phosphor bronze for example. The left end of the stylus 40 is upwardly bent and mounts a record engaging tip 41 adapted to ride in the continuous spirally cut groove of a phonograph record disc, not shown. The record engaging tip 41 may be made from sapphire, ruby or other suitable wear resistant material, all of which are well known in the art. Rearwardly of the record engaging tip 41 the stylus 40 is provided with an integral pair of upturned ears 42 adapted to engage the end of the resilient nose piece 18 to provide a driving connection between the tip 41 and the transducer element 15.

Intermediate the ends of the stylus there is provided a twisted portion 43 which is bent substantially at right angles or normally with respect to the general plane of the stylus 40. The function of the portion 43 is to contribute mechanical compliance to lateral forces exerted on the stylus and the degree of such compliance can be controlled by the size and extent of the portion 43.

At the rear end of the stylus 40 behind the twisted portion 43 there is provided a wider portion 44 having an open ended slot 45 to define a bifurcation or yoke which is adapted to be secured under the head of the screw 35. It will be noted in the various views of the drawing that the stylus holder insert 30 is of less height than the vertical thickness of the enlarged portions 24' of the housing sections 10 and 11 thus insuring a slight clearance as at 30' thereby allowing the stylus 40 to be clamped directly against the housing sections 10—11. This arrangement is such that the bifurcated end of the stylus 40 is always retained in proper relation with respect to the housing sections 10—11.

In the utilization of the assembly of the present invention the record engaging tip 41 is adapted to ride in the continuous groove of a rotating phonograph record disc and the lateral undulations experienced thereby are transmitted to the transducer element 15 via the ears 42 and nose piece 18. The operation of the stylus is totally dependent upon its physical characteristics and not upon the firmness with which it is secured to the cartridge assembly since the securing means is positioned rearwardly of the driving connection between the transducer and the stylus.

Figure 2:
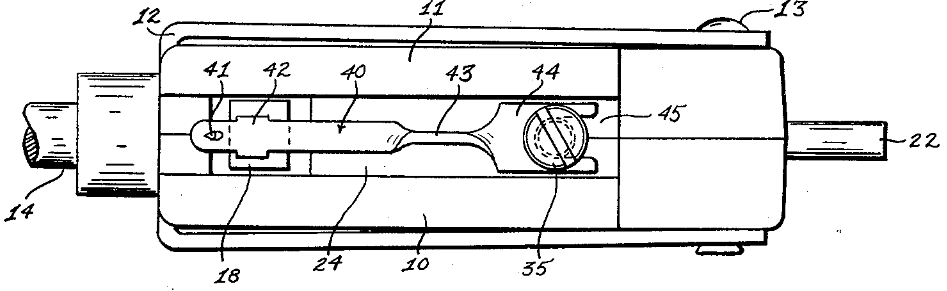
Figure 2 is a bottom plan view of the cartridge assembly of Figure 1.

As will be observed in Figure 1 of the drawing, substantially identical stylus holder and stylus assemblies are provided on each side of the transducer element 15, the main difference being the size and type of record engaging tip 41 employed. As an example, one of the tips 41 may be adapted for playing standard grooved record discs while the other may be of such size to play micro-groove record discs. Thus, upon proper positioning of the cartridge assembly the correct stylus tip will be in record engaging position.

To replace one of the styli when the record engaging tip thereof becomes worn the flat-headed screw associated therewith is loosened so that the stylus may be removed. It is noted that the screw 35 cannot become lost or misplaced since the same is captivated in the threaded aperture 34 due to the splayed end portion 36. The bifurcated rear end portion of the stylus allows the employment of such an arrangement and further provides an extremely simplified stylus assembly. A new stylus is placed in driving connection with the nose piece and the bifurcated end portion is positioned underneath the flat-headed screw 35. This screw is then tightened to clamp the rear end of the stylus tightly against the housing sections 10 and 11 and the assembly is again ready for use.

It should be apparent that the assembly above described is characterized by its extreme simplicity but yet provides an excellent means for detachably securing the stylus assemblies in the pick-up cartridge.

In accordance with the patent statutes I have shown and described a preferred illustrated embodiment of the invention. However, since many changes may be made therein without departing from the scope of the invention, reference should be had to the following appended claims.

I claim:

1. In a phonograph pick-up cartridge of the type comprising a pair of molded housing sections, said cartridge having a cavity therein for the reception of an electro-mechanical transducer element, each of said housing sections having upper and lower walls defining said cavity, a tapered recess in each of said walls, a pair of stylus holder inserts retained by said recesses when said housing sections are in assembled relation, a headed clamping screw received in each of said inserts, said screws being splayed on the upper ends thereof whereby the same are captivated in said inserts, a stylus for each of said inserts comprising a body portion mounting a record engaging tip at one end and the other end being bifurcated, and the arrangement being such that said bifurcated ends of said styli may be removably clamped under the heads of said screws.

2. Apparatus according to claim 1 further characterized in that said inserts have noncircular plan outlines, and said recesses being such as to conform to the shape of said inserts whereby turning movement thereof is prohibited.

3. In a phonograph pick-up cartridge of the type comprising a pair of formed housing sections, said housing sections each having a recess therein and a wall defining said recess, means securing said housing sections together in adjacent relation whereby said recesses define a cavity and said walls are abutted, an electro-mechanical transducer element mounted in said cavity, each of said walls having a tapered recess therein, a tapered stylus holder insert received in said tapered recesses and clamped between said housing sections, a non-removable headed clamping member extending from said stylus holder insert and projecting outwardly of said housing sections, a stylus comprising a body portion mounting a groove engaging tip adjacent one end thereof and the other end being bifurcated, coupling means interconnecting said stylus and said electro-mechanical transducer element, and said bifurcated end of said stylus being removably clamped under said headed clamping member.

4. Apparatus according to claim 3 further characterized in that said stylus holder insert has a non-circular plan outline, and said tapered recesses conforming to the shape of said insert to prevent turning movement thereof.

5. In a phonograph pick-up cartridge of the type comprising a housing having a cavity therein, an electro-mechanical transducer element mounted in said cavity, coupling means for said transducer, a stylus member connected in operative relation with said transducer by said coupling means, said stylus member having a record engaging tip at one end thereof, said stylus member being bifurcated on the opposite end thereof, said coupling means engaging said stylus member intermediate the ends thereof, an internally threaded stylus holder insert secured in said cartridge, a captivated and non-removable headed screw threadably received in said insert, said bifurcated end portion of said stylus member being removably clamped under the head of said screw, said stylus holder insert comprising a dished cup-like member having a non-circular plan outline and said insert being received entirely within said housing whereby said bifurcated end of said stylus may be clamped against said housing.

6. In a phonograph pick-up cartridge of the type comprising a pair of formed housing sections, said housing sections each having a recess therein and a wall defining said recess, means securing said housing sections together in adjacent relation whereby said recesses define a cavity and said walls are abutted, an electro-mechanical transducer element mounted in said cavity, each of said walls having an extending recess therein, a stylus holder insert received in said extending recesses and clamped between said housing sections, a non-removable headed clamping member extending from said stylus holder insert and projecting outwardly of said housing sections, a stylus comprising a body portion mounting a groove engaging tip adjacent one end thereof and the other end being bifurcated, coupling means interconnecting said stylus and said electro-mechanical transducer element, and said bifurcated end of said stylus being removably clamped under said headed clamping member.

References Cited in the file of this patent

UNITED STATES PATENTS

| | | |
|---|---|---|
| 953,934 | Vogel | Apr. 5, 1910 |
| 1,630,166 | Catlin et al. | May 24, 1927 |
| 1,639,161 | Bohlman | Aug. 16, 1927 |
| 2,239,717 | Hunt et al. | Apr. 29, 1941 |
| 2,900,452 | Bauer et al. | Aug. 18, 1959 |

FOREIGN PATENTS

| | | |
|---|---|---|
| 506,906 | Canada | Nov. 2, 1954 |
| 748,659 | Great Britain | May 9, 1956 |

OTHER REFERENCES

Journal of the Audio Engineering Society, vol. 2, No. 4, October 1954, pages 241–242.